Jan. 10, 1939.  E. C. GEBS  2,143,771
DEVICE FOR SUBDIVIDING FOODSTUFFS
Filed Aug. 12, 1937
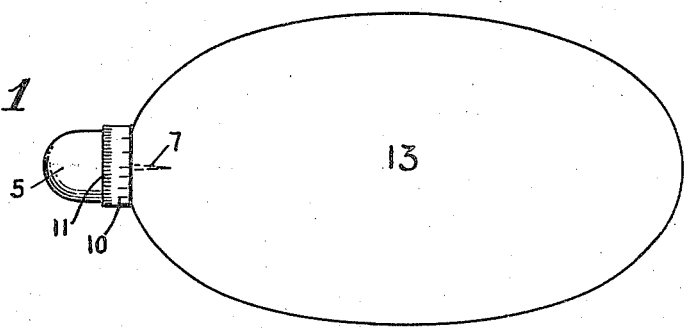
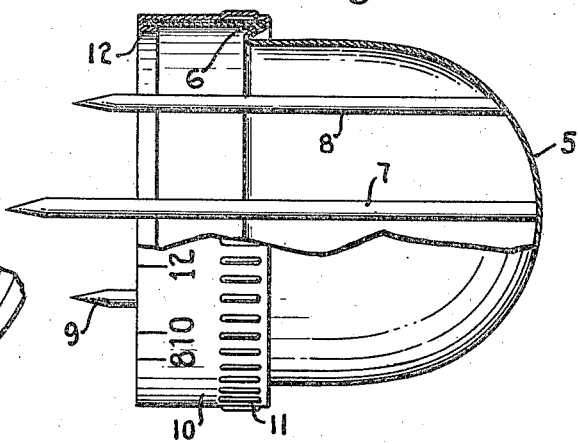
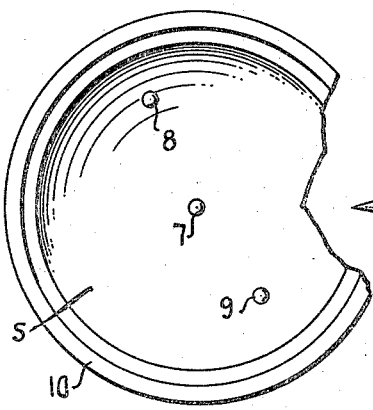
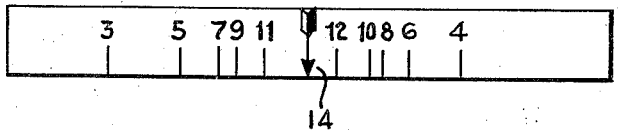
ERNEST C. GEBS
INVENTOR
BY *Victor J. Evans & Co.*
ATTORNEYS Patented Jan. 10, 1939

2,143,771

UNITED STATES PATENT OFFICE 2,143,771

DEVICE FOR SUBDIVIDING FOODSTUFFS

Ernest Christian Gebs, New York, N. Y.

Application August 12, 1937, Serial No. 158,793

4 Claims. (Cl. 33—1)

This invention relates to devices for serving portions of foods and more particularly to devices for dividing substantially spherical fruits and the like, such as melons, into portions suitable for table service.

It is an object of the present invention to provide means whereby a spherical food, such as a melon or the like, can be divided into a number of portions substantially equal in size.

It is another object of the present invention to provide means for dividing a melon or the like as aforesaid into equal portions whether the number of portions to be provided is of odd or even numerical value.

It is another object of the present invention to provide means for marking the surface of spherical foodstuffs in a number of aliquot subdivisions.

The invention will be fully and comprehensively understood from a consideration of the following detailed description when read in connection with the accompanying drawing which forms part of the application.

In the drawing:

Fig. 1 is a top plan view of a melon showing the device according to the present invention mounted in position at one end thereof.

Fig. 2 is a side view of the device according to the present invention with parts broken away to show the internal structure thereof.

Fig. 3 is a front view of the device illustrated in Fig. 2; and

Fig. 4 is a developed view of the graduated peripheral portion of the device illustrated in Fig. 2.

The device according to the present invention comprises a body member 5 preferably formed of hemi-ellipsoidal shape having a flared and bent down rim portion substantially as generally indicated at 6 in Fig. 2. The pin 7 mounted coaxially with the central axis of the handle member is of greater length than the distance between the end of the handle and the edge of the rim so that it projects therefrom substantially as shown. Pins 8 and 9 are of lesser length than the pins 7 and are likewise firmly supported in the rear portion of the handle member 5. The member 10, rotatably held upon the flared rim portion 6 of the handle 5, is knurled in the upper portion thereof substantially as indicated at 11 and bent over the end of the cylindrical rim portion as indicated at 12, whereby movement can be imparted to said member 10 relative to the handle 5 by engagement with the knurled portion thereof, but said member 10 cannot be moved parallel to the axis of said handle member. The outer peripheral portion of the member 10 is provided with graduations substantially as shown having lines carried down from the numerical values to the edge whereby the readings can be readily transferred from the graduated ring to the object being divided. The graduations correspond to aliquot parts of the diameter and for convenience are arranged with the even numbered subdivisions on one side and the odd numbered subdivisions on the other side of a marker point, substantially as shown in Fig. 4.

In use, the melon is cut from end to end, the cut passing only thru half of the melon and the device is positioned adjacent the melon with the pin 7 adapted to enter the center of one end of the melon at the end of the cut. The device is then pushed into engagement with the melon so that the pins 8 and 9 are forced into the melon and the graduated peripheral portion 10 is disposed adjacent the surface. The index 14 is then positioned in alignment with the cut made in the melon as hereinbefore mentioned and indicating means are positioned on the surface of the melon adjacent the graduated peripheral portion of the device and at a point corresponding to the number of pieces wherein it is desired to divide the melon. For example, if it is desired to divide the melon into seven aliquot portions the index is set at the cut as hereinbefore mentioned and a marker, for example a slip of wood such as a toothpick or the like, inserted in the surface of the melon at a point adjacent the number "7" on the graduated peripheral rim portion. The rim is then turned until the index corresponds with the marker placed as hereinbefore mentioned and the operation is repeated.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. A device for the purpose herein described comprising a hollow handle portion substantially hemi-ellipsoidal in shape having a pin of greater length than the length of the handle member along the major axis thereof and disposed coaxially with said axis, said pin being fixedly attached to said handle member, a plurality of pins fixedly attached to said handle and disposed parallel to aforesaid pin, and a graduated member positioned on the edge of said handle member and rotatable relative thereto.

2. A device for the purpose herein described comprising a hollow handle portion having a plurality of pins fixedly mounted thereon and projecting therefrom, at least one of said pins being disposed coaxially with the axis of said handle member, and a rotatable cylindrical sleeve member attached to the edge of said handle and carrying graduations indicating aliquot portions of a circle.

3. A device for dividing melons comprising a hollow handle element having a pin mounted coaxially with the axis of said handle, a plurality of pins mounted on said handle and parallel to the first mentioned pin, a graduated rim portion mounted on and rotatable relative to said handle member, said graduations indicating aliquot portions of a circle.

4. A device for dividing melons comprising a hollow handle element having a pin mounted coaxially with the axis of said handle, a plurality of pins mounted on said handle and parallel to the first mentioned pin, a graduated rim portion mounted on and rotatable relative to said handle member and having a knurled edge adapted to engage with the hand of the user, said graduations indicating aliquot portions of a circle.

ERNEST CHRISTIAN GEBS.